United States Patent [19]

Narita et al.

[11] Patent Number: 5,316,746

[45] Date of Patent: May 31, 1994

[54] HIGH PURITY IRON OXIDE AND METHOD FOR PRODUCTION HEREOF

[75] Inventors: Yuuki Narita; Takero Ito; Shuetsu Ogasawara, all of Tokyo, Japan

[73] Assignees: Kawasaki Steel Corporation; Kawatetsu Mining Co., Ltd., both of Japan

[21] Appl. No.: 48,968

[22] Filed: Apr. 16, 1993

Related U.S. Application Data

[63] Continuation of Ser. No. 830,664, Feb. 4, 1992, abandoned.

[30] Foreign Application Priority Data

Feb. 5, 1991 [JP] Japan ................................. 3-100547
Feb. 5, 1991 [JP] Japan ................................. 3-100548

[51] Int. Cl.$^5$ ............................................. C01G 49/02
[52] U.S. Cl. .................................... 423/151; 423/138; 423/148; 423/632; 423/633; 423/634
[58] Field of Search ............... 423/138, 148, 151, 632, 423/633, 634; 252/62.56, 62.59, 62.55, 62, 62.51

[56] References Cited

U.S. PATENT DOCUMENTS

| | | | |
|---|---|---|---|
| 3,007,775 | 11/1961 | Llewelyn ........................ | 423/633 |
| 3,672,579 | 6/1972 | Lawver ........................... | 241/24 |
| 4,133,677 | 1/1979 | Matsui et al. .................. | 423/633 |
| 4,309,459 | 1/1982 | Takuoka ......................... | 423/633 |
| 4,319,988 | 3/1982 | Aldrich ........................ | 209/172.5 |
| 4,378,252 | 3/1983 | Kiemle et al. ................. | 423/633 |
| 5,032,367 | 7/1991 | Hirai et al. .................... | 423/142 |

FOREIGN PATENT DOCUMENTS

| | | |
|---|---|---|
| 56-86646 | 7/1981 | Japan . |
| 57-181554 | 11/1982 | Japan . |
| 57-205324 | 12/1982 | Japan . |
| 61-25157 | 2/1986 | Japan . |
| 61-238901 | 10/1986 | Japan . |
| 62-36025 | 2/1987 | Japan . |

*Primary Examiner*—David Brunsman
*Attorney, Agent, or Firm*—Austin R. Miller

[57] ABSTRACT

A method for producing high-purity iron oxide which comprises pulverizing iron ore into powder having an average particle diameter of 20–150 μm, removing fine particles from the powder, and subjecting the powder to wet magnetic separation in a magnetic field of 1000–15000 gauss for the removal of impurities. The iron oxide powder may undergo the secondary steps of pulverization and classification, which are performed by the combination of a wet grinding means and a wet cyclone, and drying and calcination.

11 Claims, 11 Drawing Sheets

HIGH PURITY IRON OXIDE AND METHOD FOR PRODUCTION HEREOF

This application is a continuation of application Ser. No. 07/830,664, filed Feb. 4, 1992, now abanonded.

BACKGROUND OF THE INVENTION

1. Field of the Invention

The present invention relates to a high-purity iron oxide as a raw material of ferrites which is produced from iron ore, and to a method for producing the same.

2. Description of the Prior Art

There are several methods for producing from iron ore an iron oxide as a raw material of ferrites. A common method consists of crushing, classification, and mineral dressing, with the starting material being hematite or magnetite. The mineral dressing includes table gravity concentration, flotation, and magnetic separation. These methods are combined with one another or followed by chemical treatments. The combination of mineral dressing methods is disclosed in Japanese Patent Publication No. 4536/1990 and Japanese Patent Laid-open No. 11526/1988. The chemical treatments following mineral dressing are disclosed in Japanese Patent Laid-open Nos. 295239/1986 and 69527/1989.

The iron oxide produced as mentioned above is mixed with strontium carbonate and barium carbonate in the production of ferrites. The mixing of a plurality of raw materials is accomplished by dry process or wet process, the former consisting of mixing raw materials in dry powder form for several hours in a vibrating rod mill or Eirich mixer, and the latter consisting of mixing raw materials in slurry form (about 50% concentration) for several hours in a mixing ball mill.

There are two kinds of iron oxides as a raw material of ferrites. One is produced by pulverizing iron ore as mentioned above, and the other is produced from iron compounds such as iron chloride and iron sulfate. The former is inferior to the latter; that is, it contains a large amount of impurities such as $SiO_2$ and $Al_2O_3$, which make it unsuitable as a raw material of high-quality ferrites. To address this problem, the present inventors carried out extensive studies and, as the result, succeeded in producing from iron ore a high-purity iron oxide containing less than 0.15% $SiO_2$ and less than 0.1% $Al_2O_3$.

It is an object of the present invention to provide a high-purity iron oxide as a raw material of high-quality ferrites.

It is another object of the present invention to provide a method for producing said high-purity iron oxide from iron ore.

It is another object of the present invention to provide a method for producing a high-purity iron oxide fine powder having a uniform particle size which is suitable as a raw material of high-performance ferrites.

SUMMARY OF THE INVENTION

The object of the present invention is achieved by the complete removal of gangue minerals in the steps of classification and wet magnetic separation rather than excessive pulverization as in the conventional method.

The present invention is based on the finding that it is possible to produce a high-purity iron oxide containing less than 0.15% $SiO_2$ and less than 0.1% $Al_2O_3$, if iron ore is purified by the steps of wet or dry pulverization, classification, and wet magnetic separation.

According to the present invention, a high-purity iron oxide is produced by pulverization which is carried out in such a manner as to give a powder having an average particle diameter of 20–150 μm, wet or dry classification which is intended to remove extremely fine particles, and wet magnetic separation which is carried out in a magnetic field of 1000–15000 gauss.

According to the present invention, iron oxide powder with a uniform particle size suitable for the production of ferrites is produced in two stages. The first stage is the production of a high-purity iron oxide from iron ore by the complete removal of gangue minerals which is accomplished by a series of steps including ore pulverization, classification, and wet magnetic separation. The second stage is the secondary pulverization and classification, which is accomplished by the combination of a wet pulverizing means and a wet cyclone. The thus obtained iron oxide fine power is finally dried and calcined.

According to the present invention, the steps of pulverization, classification, and wet magnetic separation in the first stage are carried out in a specific manner. The pulverization should preferably be carried out in such a manner as to give a powder having an average particle diameter of 20–150 μm. The wet magnetic separation should preferably be carried out in a magnetic field of 1000–15000 gauss, so that the resulting iron oxide contains less than 0.15% $SiO_2$ and less than 0.1% $Al_2O_3$.

According to the present invention, the secondary pulverization and classification should be carried out by the combination of a wet grinding mill and a wet cyclone (25–75 mm in diameter, for example). The classification may be repeated by using a wet cyclone of different diameter, if necessary. The drying and calcination should preferably be carried out at 200° C. or above in an oxidative atmosphere. The foregoing steps give rise to a high-purity iron oxide fine powder having a sharp particle size distribution, with an average particle size in a range of 0.8–2 μm, 2–10 μm, and 10–30 μm.

According to the present invention, it is important that pulverization be performed to give particles in a certain range of size as specified above instead of giving extremely fine particles. Moreover, it is important that purification be carried out by means of wet magnetic separation. (Dry magnetic separation does not yield high-purity products due to poor dispersion.) Incidentally, the wet magnetic separation in the present invention differs from those employed in Japanese Patent Publication No. 4536/1990 and Japanese Patent Laid-open No. 11526/1988. The former needs the addition of ferromagnetic powder and does not yield high-purity products. The latter is poor in separation and yields due to excessively fine particles which are liable to hetero-aggregation. Unlike these prior art technologies, the method of the present invention yields a high-purity product on account of the specific average particle diameter established in the step of pulverization.

Pulverization separates gangue minerals (impurities) in the form of fine particles because they are readily ground. Coarse particles resulting from pulverization permit high yields by wet magnetic separation.

Classification removes gangue minerals (impurities) in the form of fine particles. The removal of fine particles is important to prevent the hetero-aggregation of iron oxide powder with gangue minerals in the step of wet magnetic separation. This leads to improved separation.

The wet magnetic separation permits gangue minerals to be removed completely owing to good dispersion. This leads to the production of iron oxide with extremely low $SiO_2$ and $Al_2O_3$ contents.

The secondary pulverization and classification, which is accomplished by the combination of a wet grinding mill and a wet cyclone (of different diameter), yield iron oxide powder having a very sharp particle size distribution because of the control of excessive pulverization. The iron oxide powder is finally calcined at 200° C. or above in an oxidative atmosphere to reduce the content of Fed by oxidation.

As mentioned above, the present invention provides a method for producing a high-purity iron oxide powder with extremely low $SiO_2$ and $Al_2O_3$ contents. The method consists of pulverization of iron ore into powder with a specific average particle diameter, removal of fine particles of gangue minerals by classification, and wet magnetic separation. This method prevents the aggregation of iron oxide powder with gangue mineral powder and gives rise to coarse powder to be fed to magnetic separation, which leads to improved yields. The thus obtained high-purity iron oxide powder permits the addition of $SiO_2$ and $Al_2O_3$ over a broad range when used as a raw material of high-quality ferrites.

According to another embodiment of the present invention, the high-purity iron oxide powder obtained by wet magnetic separation as mentioned above undergoes the secondary pulverization and classification which is carried out by the combination of a wet grinding means and a wet cyclone, and the iron oxide powder is finally dried and calcined. The thus obtained powder is very fine and has a sharp particle size distribution. Moreover, it has a low FeO content and a uniform particle size (on account of suppressed sintering at the time of calcination). These properties are desirable for the production of high-quality ferrites.

DESCRIPTION OF THE PREFERRED EMBODIMENTS

The present invention will be explained with reference to the following examples.

Examples 1 to 5 and Comparative Examples 1 to 3 demonstrate the production from iron or of high-purity iron oxide containing less than 0.15% $SiO_2$ and less than 0.1% $Al_2O_3$. Their respective flow diagrams are shown in FIGS. 1 to 8. Analytical data of the iron ore and processed iron oxide are given in Table 1.

TABLE 1

|  | T—Fe | FeO | $SiO_2$ | $Al_2O_3$ | MnO | CaO | MgO |
|---|---|---|---|---|---|---|---|
| Iron Core | 67.92 | 0.07 | 0.77 | 0.65 | 0.38 | 0.03 | 0.05 |
| Example 1 | 69.38 | 0.10 | 0.14 | 0.09 | 0.15 | 0.01 | 0.02 |
| Example 2 | 69.40 | 0.12 | 0.12 | 0.08 | 0.15 | 0.02 | 0.02 |
| Example 3 | 69.37 | 0.11 | 0.14 | 0.10 | 0.15 | 0.01 | 0.02 |
| Example 4 | 69.40 | 0.10 | 0.12 | 01.0 | 0.15 | 0.01 | 0.02 |
| Example 5 | 69.37 | 0.09 | 0.14 | 0.09 | 0.15 | 0.01 | 0.02 |
| Comparative example 1 | 69.01 | 0.17 | 0.28 | 0.18 | 0.18 | 0.03 | 0.05 |
| Comparative example 2 | 69.07 | 0.19 | 0.26 | 0.20 | 0.18 | 0.03 | 0.05 |
| Sinks Comparative example 3 | 68.97 | 0.15 | 0.22 | 0.37 | 0.18 | 0.03 | 0.05 |

EXAMPLE 1

Figure 1:
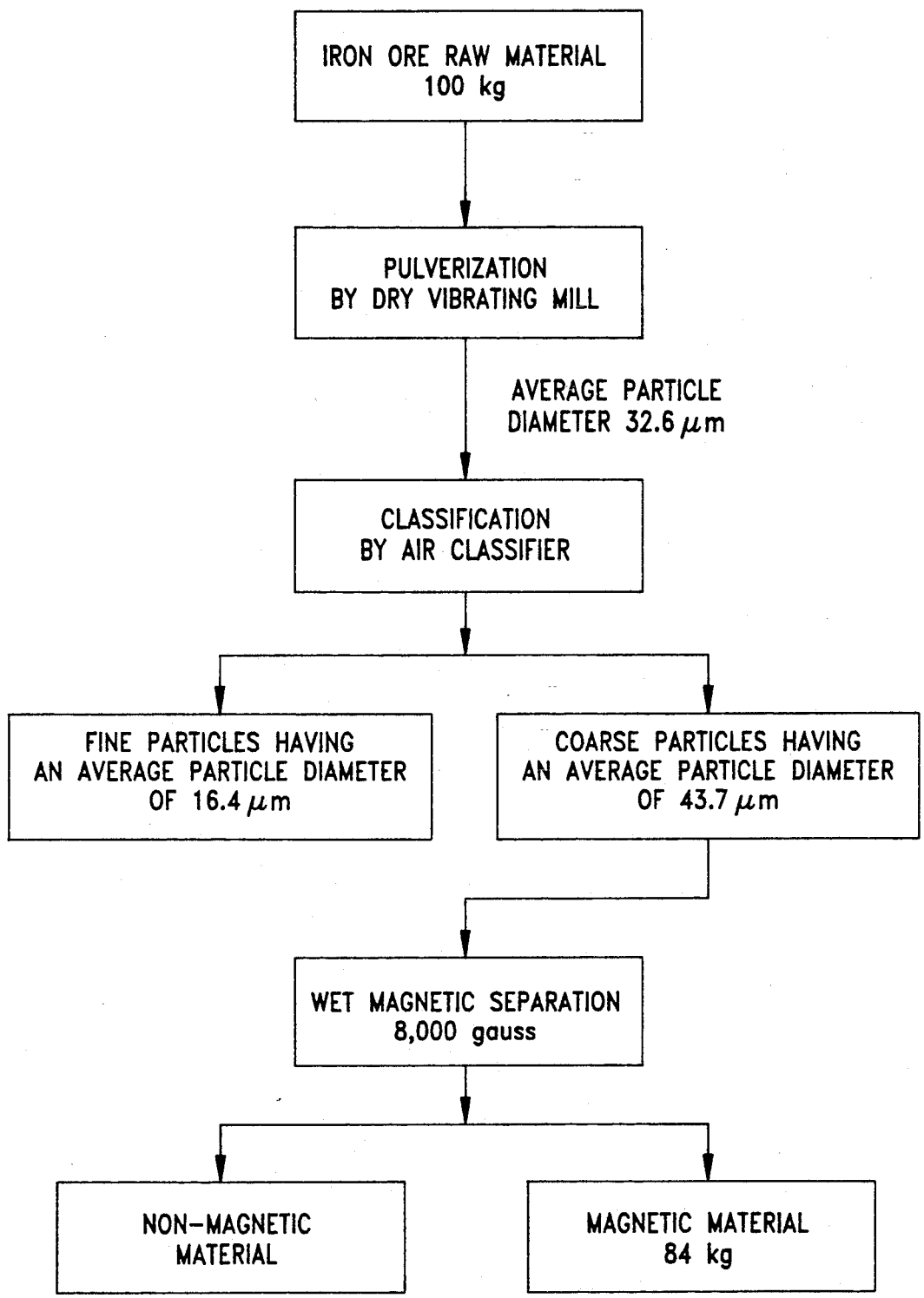
FIG. 1 is a flow diagram of the production of iron oxide from iron ore in Example 1.

According to the flow diagram shown in FIG. 1, 100 kg of iron ore (as raw material) was pulverized using a dry vibrating mill into powder having an average particle diameter of 32.6 μm, the powder underwent air classification for the removal of fine particles (having an average particle diameter of 16.4 μm), and the coarse powder (having an average particle diameter of 43.7 μm) underwent wet magnetic separation in a magnetic field of 8000 gauss for the removal of non-magnetic materials. Thus there was obtained 84 kg of magnetic material (desired product). This product was found by chemical analysis to contain 0.14% $SiO_2$ and 0.09% $Al_2O_3$. (The wet magnetic separation was carried out using a wet-type magnetic separator, Model CF-5, made by Elise Magnetics Co., Ltd.)

EXAMPLE 2

Figure 2:
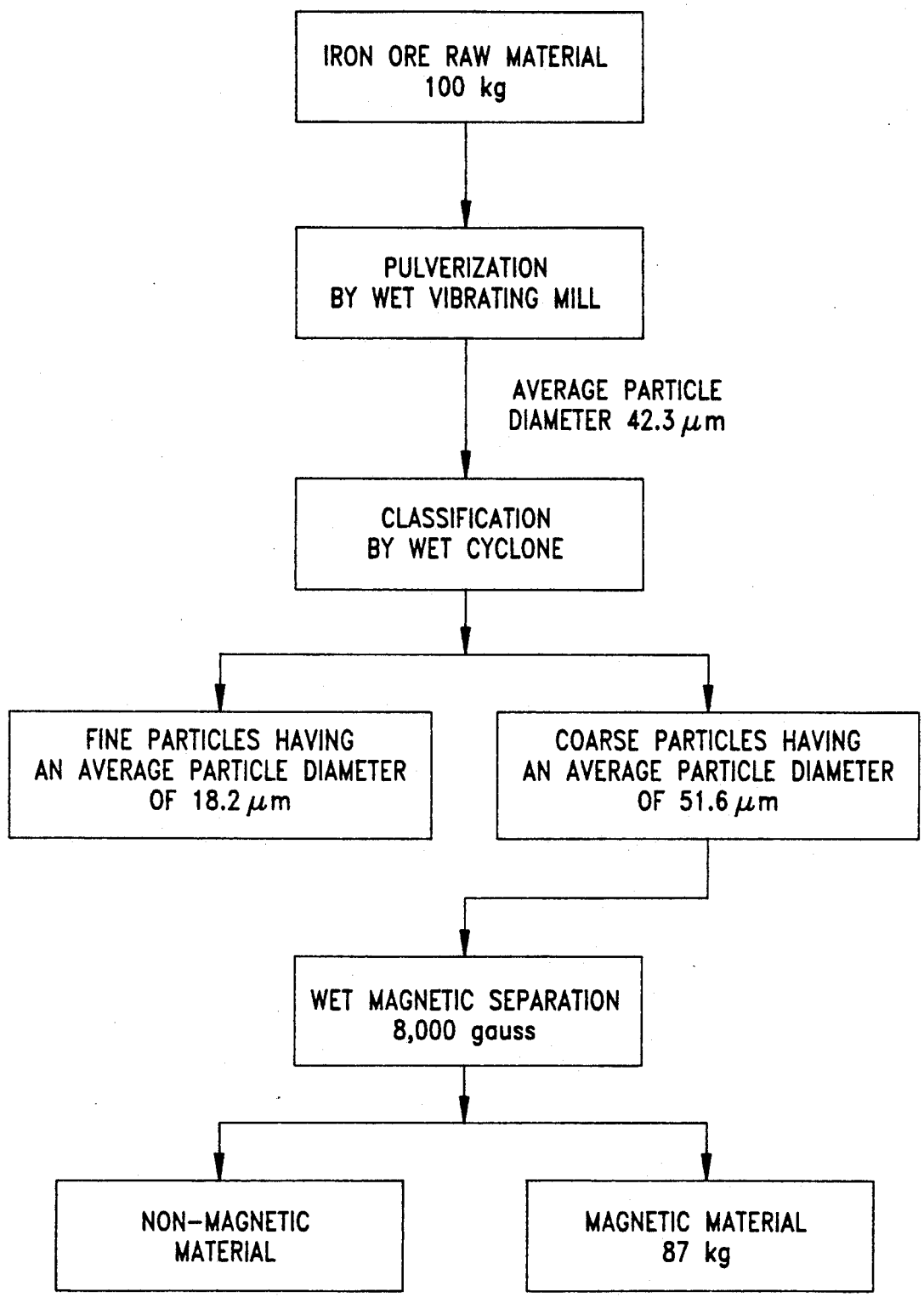
FIG. 2 is a flow diagram of the production of iron oxide from iron ore in Example 2.

According to the flow diagram shown in FIG. 2, 100 kg of iron ore (as raw material) was pulverized using a wet vibrating mill into powder having an average particle diameter of 42.3 μm, the powder underwent classification by a wet cyclone for separation into fine particles (having an average particle diameter of 18.2 μm) and coarse particles (having an average particle diameter of 51.6 μm), and the coarse particles underwent wet magnetic separation in the same manner as in Example 1. Thus there was obtained 87 kg of magnetic material (desired product). This product was found by chemical analysis to contain 0.12% $SiO_2$ and 0.08% $Al_2O_3$.

EXAMPLE 3

Figure 3:
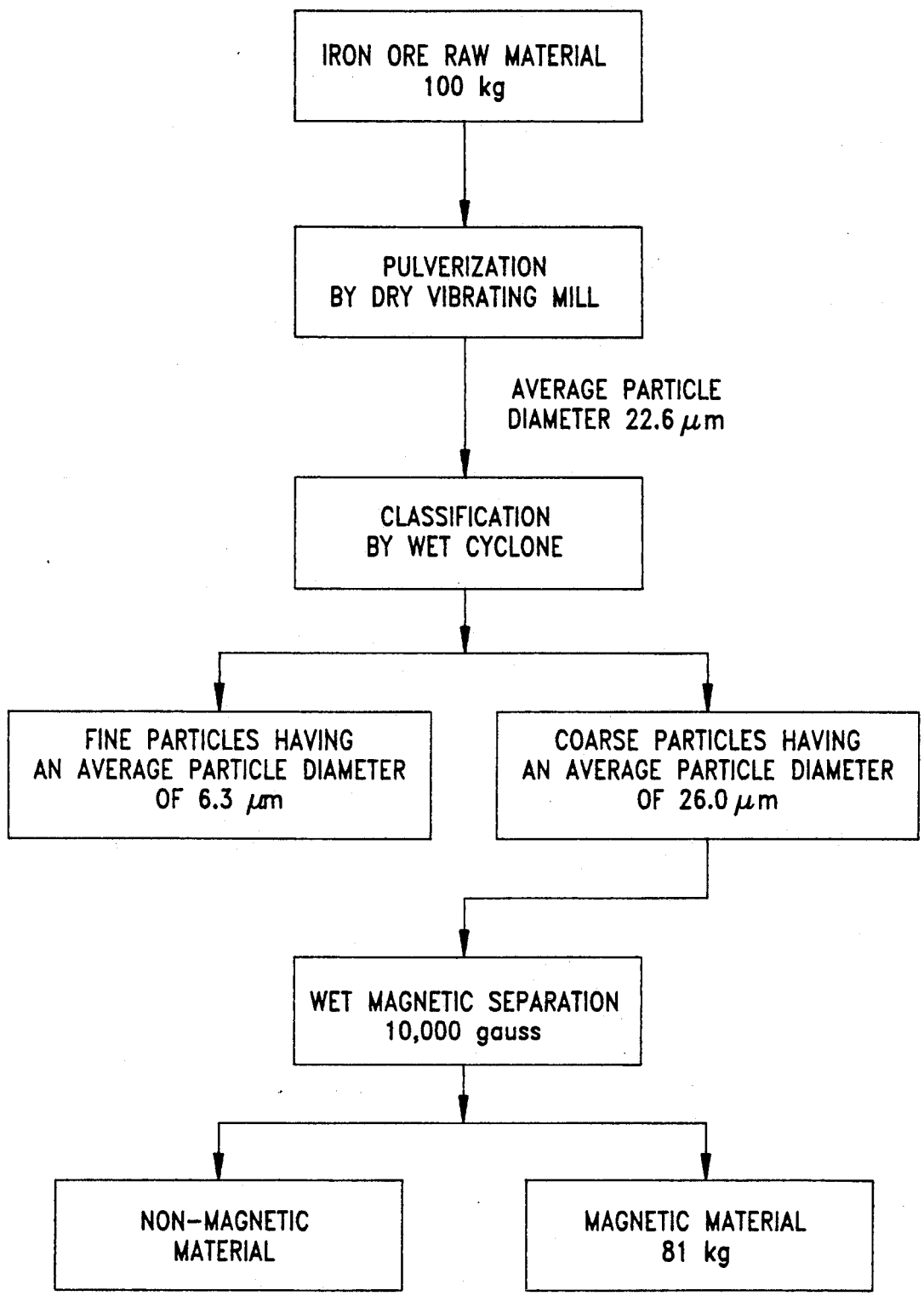
FIG. 3 is a flow diagram of the production of iron oxide from iron ore in Example 3.

According to the flow diagram shown in FIG. 3, 100 kg of iron ore (as raw material) was pulverized using a wet vibrating mill into powder having an average particle diameter of 22.6 μm, the powder underwent classification by a wet cyclone for separation into fine particles (having an average particle diameter of 6.3 μm) and coarse particles (having an average particle diameter of 26.0 μm), and the coarse particles underwent wet magnetic separation in a magnetic field of 10,000 gauss for the removal of nonmagnetic materials. Thus there was obtained 81 kg of magnetic material (desired product). This product was found by chemical analysis to contain 0.14% $SiO_2$ and 0.10% $Al_2O_3$.

EXAMPLE 4

Figure 4:
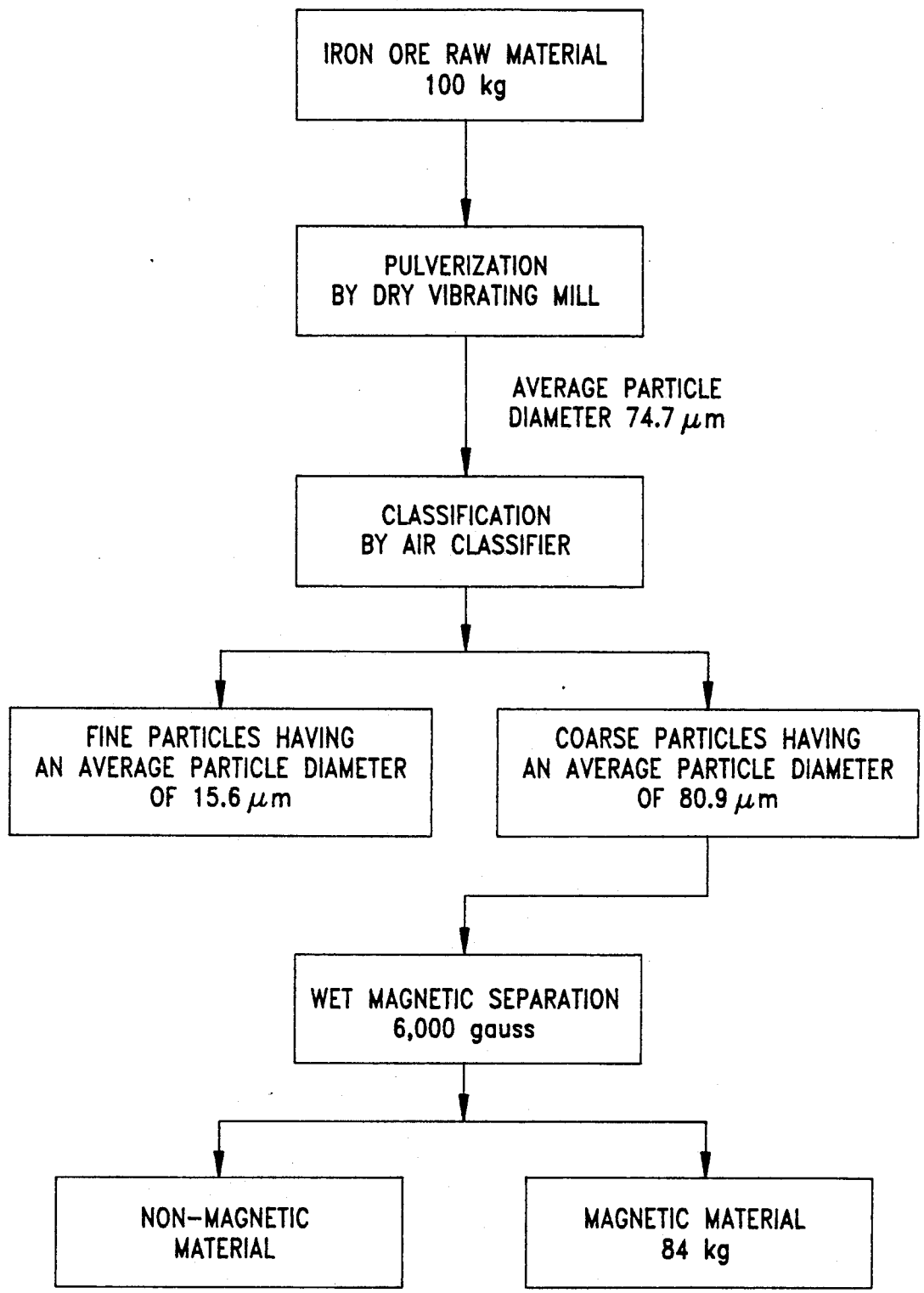
FIG. 4 is a flow diagram of the production of iron oxide from iron ore in Example 4.

According to the flow diagram shown in FIG. 4, 100 kg of iron ore (as raw material) was pulverized using a dry vibrating mill into powder having an average particle diameter of 74.1 μm, the powder underwent air classification for the removal of fine particles (having an average particle diameter of 15.6 μm), and the coarse powder (having an average particle diameter of 80.9 μm) underwent wet magnetic separation in a magnetic field of 6000 gauss for the removal of non-magnetic materials. Thus there was obtained 84 kg of magnetic material (desired product). This product was found by chemical analysis to contain 0.12% $SiO_2$ and 0.10% $Al_2O_3$.

EXAMPLE 5

Figure 5:
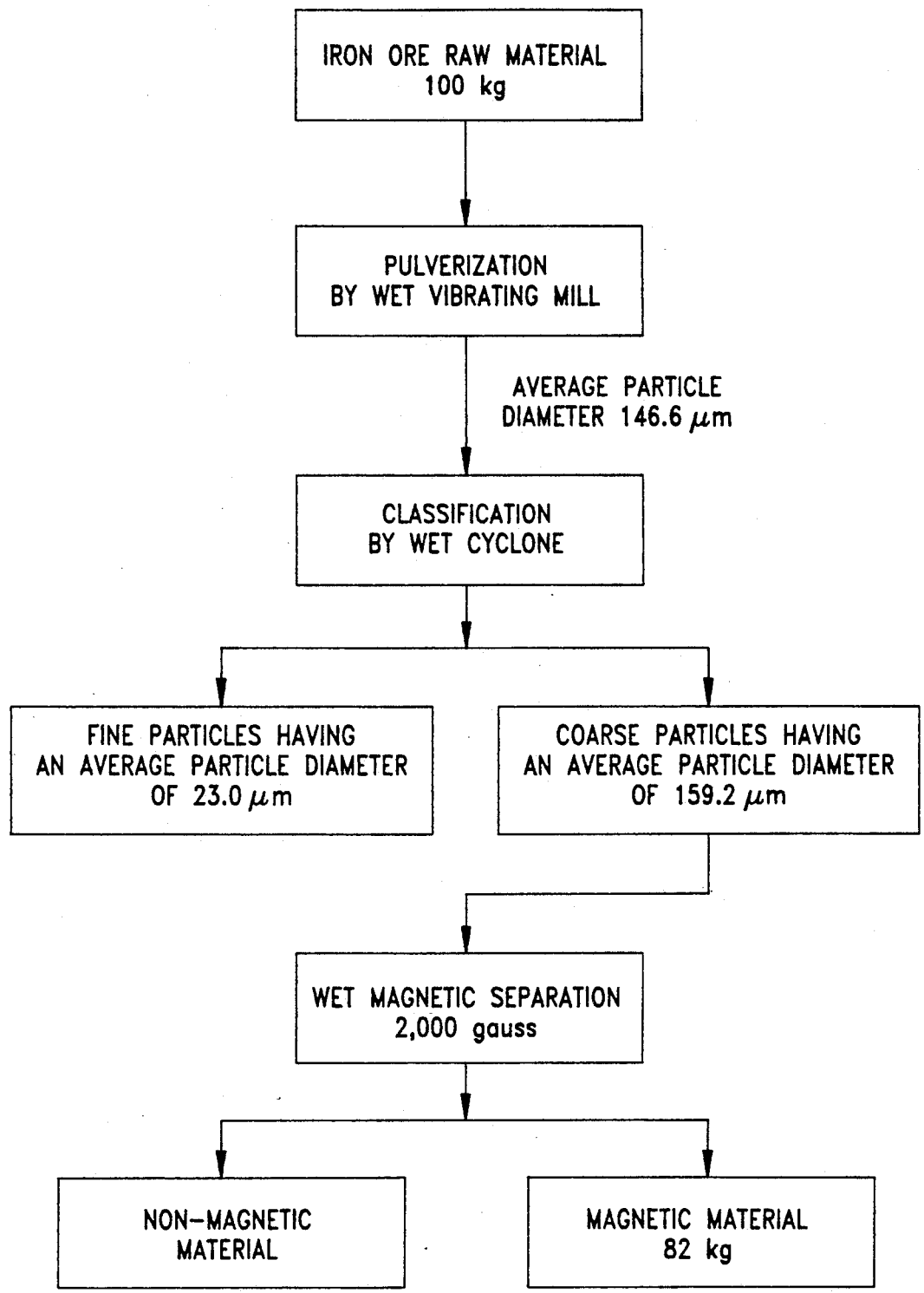
FIG. 5 is a flow diagram of the production of iron oxide from iron ore in Example 5.

According to the flow diagram shown in FIG. 5, 100 kg of iron ore (as raw material) was pulverized using a wet vibrating mill into powder having an average particle diameter of 146.6 μm, the powder underwent classification by a wet cyclone for separation into fine particles (having an average particle diameter of 23.0 μm) and coarse particles (having an average particle diameter of 159.2 μm), and the coarse particles underwent wet magnetic separation in a magnetic field of 2000 gauss for the removal of non-magnetic materials. Thus there was obtained 82 kg of magnetic material (desired product). This product was found by chemical analysis to contain 0.14% $SiO_2$ and 0.09% $Al_2O_3$.

COMPARATIVE EXAMPLE 1

Figure 6:
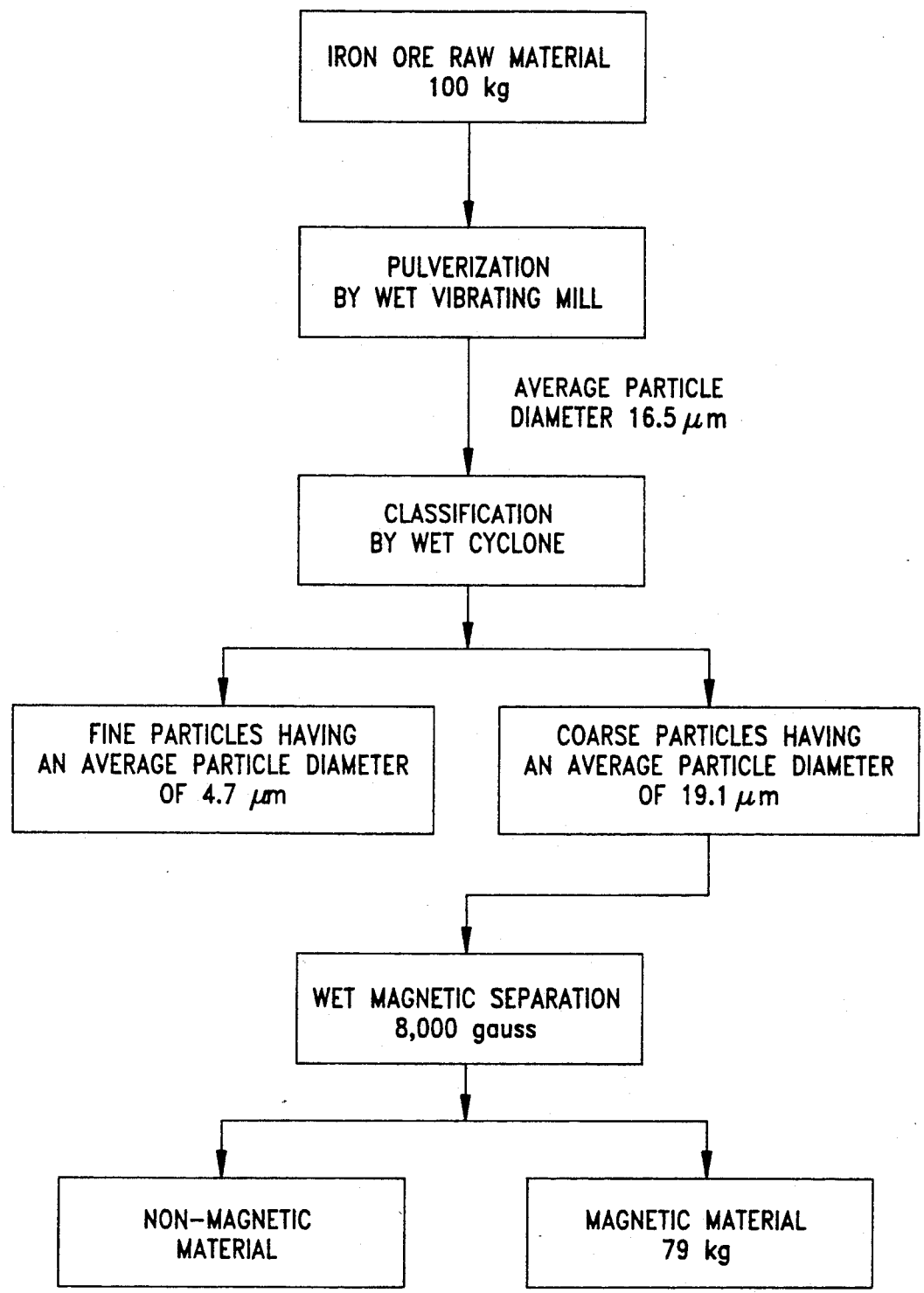
FIG. 6 is flow diagram of the production of iron oxide from iron ore in Comparative Example 1.

According to the flow diagram shown in FIG. 6, 100 kg of iron ore (as raw material) was pulverized using a wet vibrating mill into powder having an average particle diameter of 16.5 μm, the powder underwent classification by a wet cyclone for separation into fine particles (having an average particle diameter of 4.7 μm) and coarse particles (having an average particle diameter of 19.1 μm), and the coarse particles underwent wet magnetic separation in a magnetic field of 8000 gauss for the removal of non-magnetic materials. Thus there was obtained 79 kg of magnetic material. This magnetic material was found by chemical analysis to contain 0.28% $SiO_2$ and 0.18% $Al_2O_3$. The high $SiO_2$ and $Al_2O_3$ contents are due to the inadequate pulverization of iron ore that gave rise to excessively fine particles (16.5 μm).

COMPARATIVE EXAMPLE 2

Figure 7:
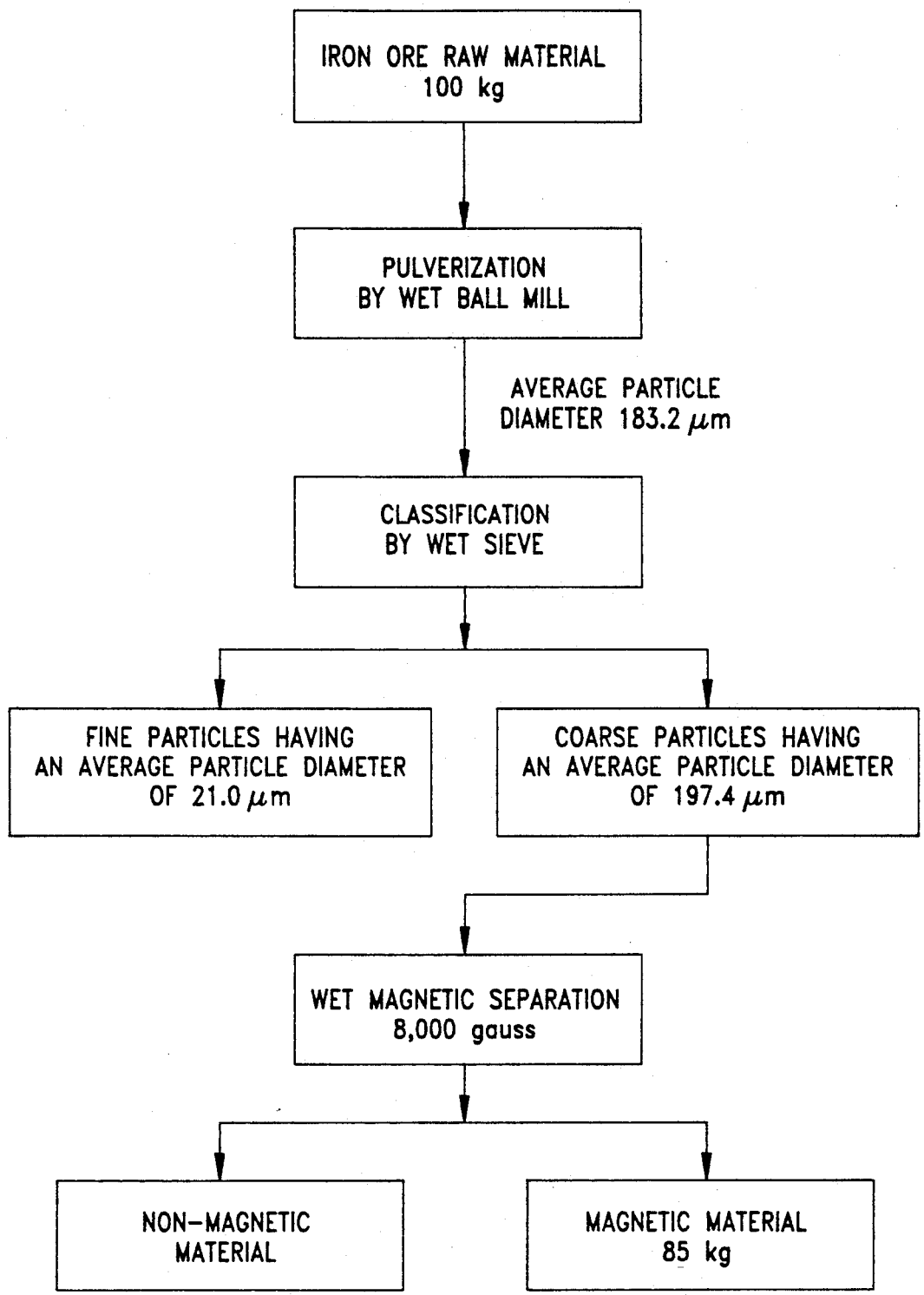
FIG. 7 is a flow diagram of the production of iron oxide from iron ore in Comparative Example 2.

According to the flow diagram shown in FIG. 7, 100 kg of iron ore (as raw material) was pulverized using a wet ball mill into powder having an average particle diameter of 183.2 μm, the powder underwent dry sieving for separation into fine particles (having an average particle diameter of 21.0 μm) and coarse particles (having an average particle diameter of 197.4 μm), and the coarse particles underwent wet magnetic separation in a magnetic field of 8000 gauss for the removal of nonmagnetic materials. Thus there was obtained 85 kg of magnetic material. This magnetic material was found by chemical analysis to contain 0.26% $SiO_2$ and 0.20% $Al_2O_3$. The high $SiO_2$ and $Al_2O_3$ contents are due to the inadequate pulverization of iron ore that gave rise to excessively coarse particles (183.2 μm).

COMPARATIVE EXAMPLE 3

Figure 8:
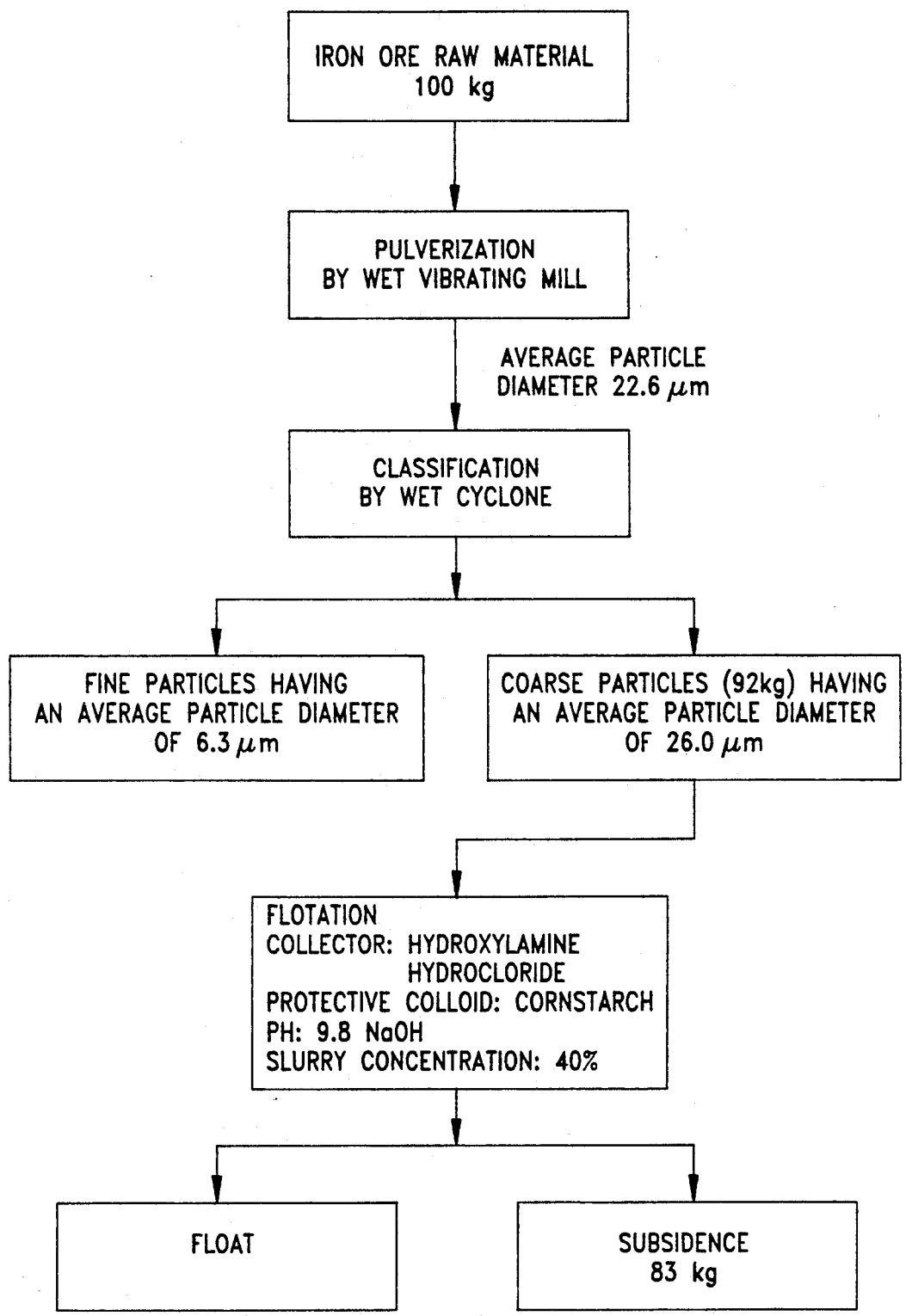
FIG. 8 is a flow diagram of the production of iron oxide from iron ore in Comparative Example 3.

According to the flow diagram shown in FIG. 8, 100 kg of iron ore (as raw material) was pulverized using a wet vibrating mill into powder having an average particle diameter of 22.6 μm, and the powder underwent classification by a wet cyclone for separation into fine particles (having an average particle diameter of 6.3 μm) and coarse particles (having an average particle diameter of 26.0 μm). Thus there wa obtained 92 kg of coarse powder. The coarse powder underwent flotation under the following conditions.

Collector : hydroxylamine hydrochloride
Protective colloid : corn starch
pH : 9.8 (NaOH)
Slurry concentration : 40%

There was obtained 83 kg of concentrate (sinks). This concentrate was found by chemical analysis to contain 0.22% $SiO_2$ and 0.37% $Al_2O_3$. The high $SiO_2$ and $Al_2O_3$ contents are due to flotation in place of wet magnetic separation.

The above-mentioned Examples 1 to 5 and Comparative Examples 1 to 3 demonstrate that it is possible to produce high-purity iron oxide containing less than 0.15% $SiO_2$ and less than 0.1% $Al_2O_3$ by the process which consists of pulverizing iron ore into powder having an average particle diameter of 20–150 μm, removing fine particles from the powder, and removing impurities from the powder by wet magnetic separation in a strong magnetic field of 1000–15000 gauss.

The following Examples 6 to 8 and Comparative Examples 4 and 5 demonstrate the production of high-purity iron oxide powder having a uniform particle size from the magnetic material obtained as mentioned above. The flow diagrams for the production process are given in FIGS. 9 to 11. The high-purity iron oxide powders (after calcination) obtained in these examples have the characteristic properties as shown in Table 2.

TABLE 2

| | T—Fe | FeO | $SiO_2$ | $Al_2O_3$ | MnO | MgO | CaO | Average particle diameter (μm) | Maximum particle diameter (μm) | Particle diameter smaller than 1.0 μm (wt%) |
|---|---|---|---|---|---|---|---|---|---|---|
| Example No. | | | | | | | | | | |
| 6 | 69.40 | 0.07 | 0.12 | 0.09 | 0.15 | 0.02 | 0.02 | 15.1 | 40.5 | 2.6 |
| 7 | 69.40 | 0.06 | 0.12 | 0.09 | 0.15 | 0.02 | 0.02 | 2.8 | 14.1 | 18.1 |
| 8 | 69.40 | 0.06 | 0.12 | 0.09 | 0.15 | 0.02 | 0.02 | 1.2 | 7.9 | 23.0 |
| Comparative example No. | | | | | | | | | | |
| 4 | 69.40 | 0.07 | 0.12 | 0.09 | 0.15 | 0.02 | 0.02 | 18.2 | 182.0 | 8.5 |
| 5 | 69.40 | 1.62 | 0.12 | 0.09 | 0.15 | 0.02 | 0.02 | 2.8 | 14.1 | 18.1 |

EXAMPLE 6

Figure 9:
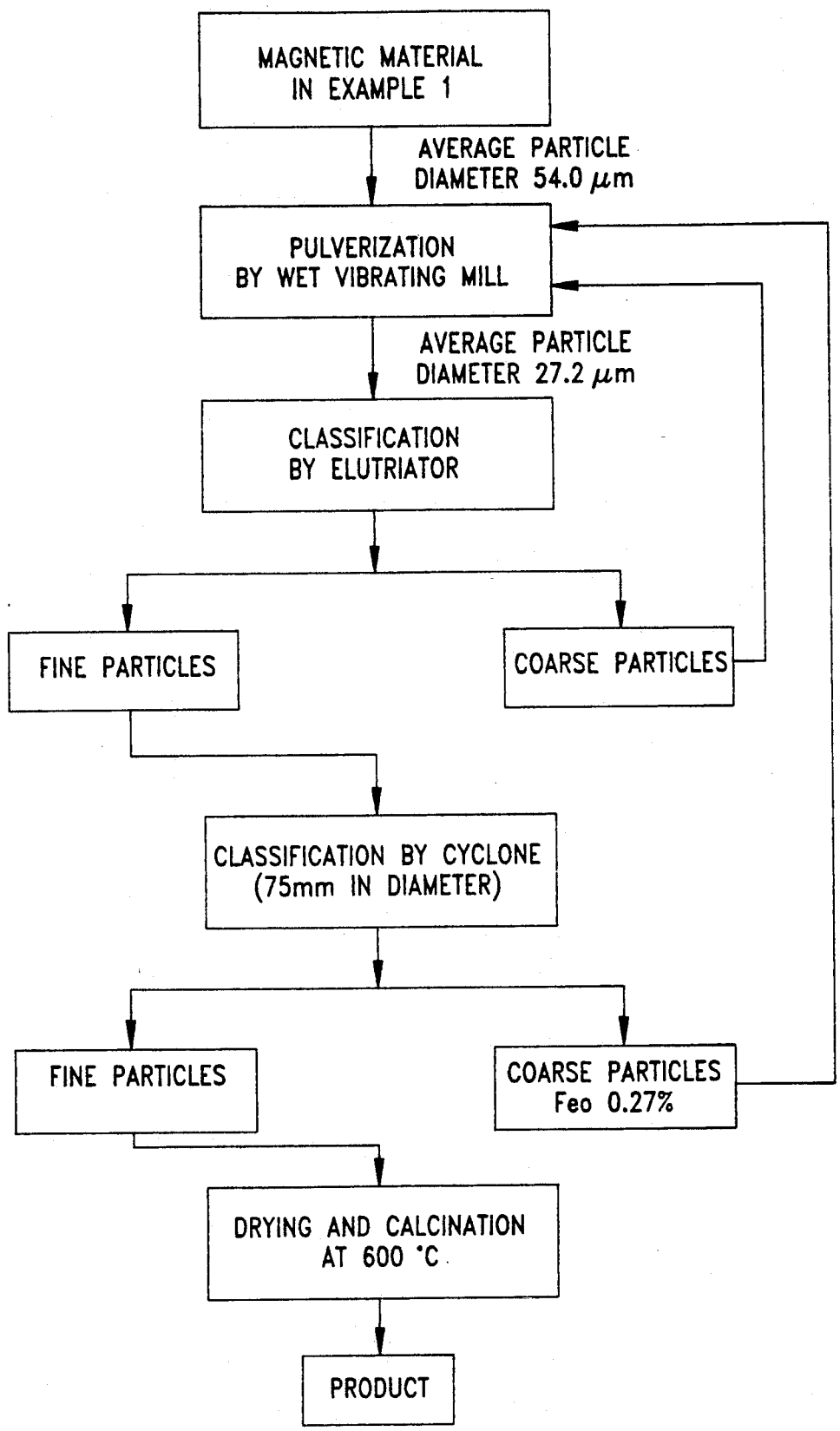
FIG. 9 is a flow diagram of the production of the product in Example 6.

According to the flow diagram shown in FIG. 9, the high-purity iron oxide (magnetic material) obtained in Example 1 was pulverized into powder having an average particle diameter of 27.2 μm using a wet grinding mill, the powder was separated into fine particles and coarse particles by hydraulic elutriation, the fine particles were further separated into fine particles and coarse particles using a wet cyclone (75 mm in diameter), and the fine particles were dried and calcined at 600° C. The coarse particles separated by the elutriator and wet cyclone were returned to the wet vibrating mill.

EXAMPLE 7

Figure 10:
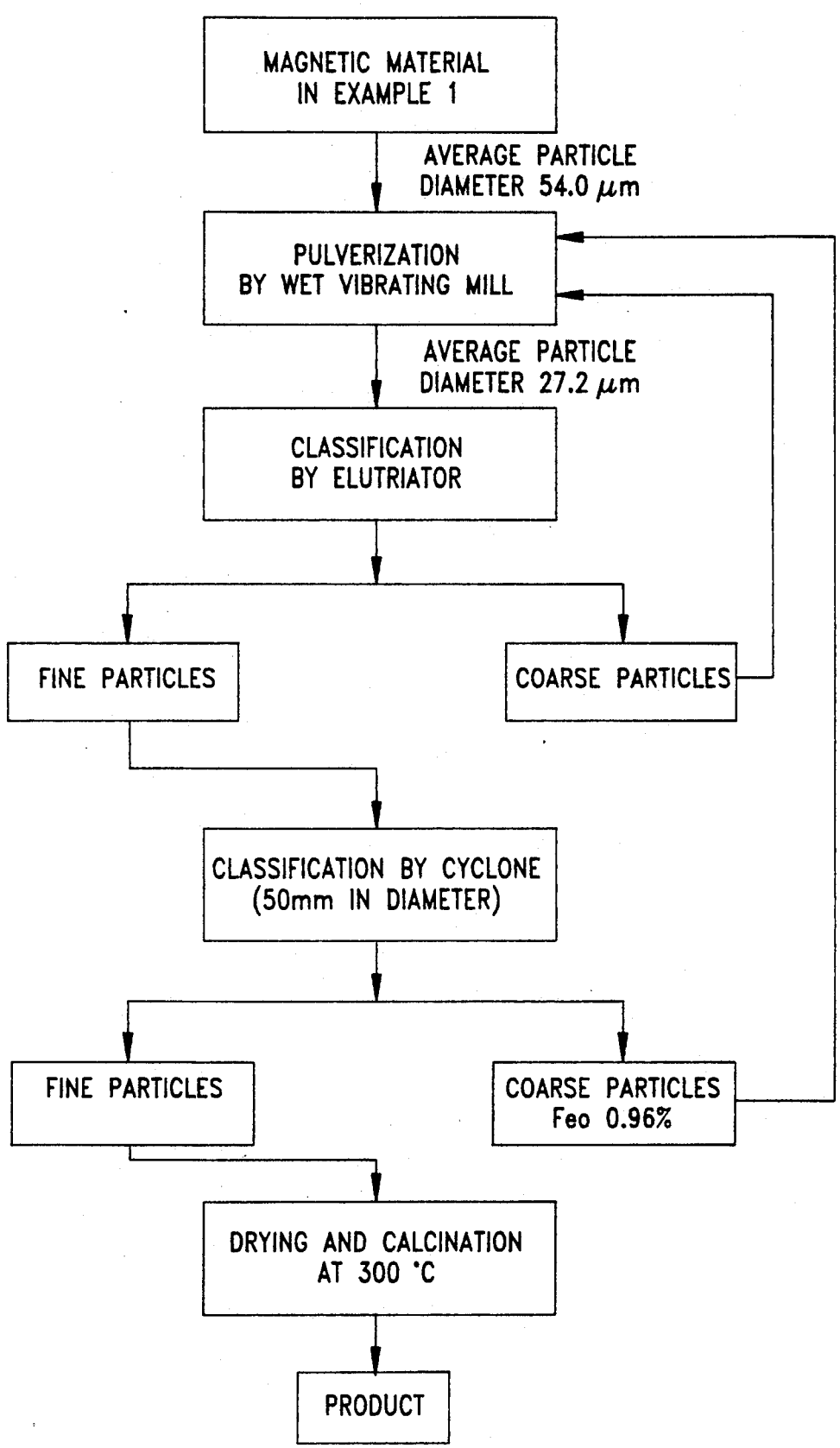
FIG. 10 is flow diagram of the production of the product in Example 7.

According to the flow diagram shown in FIG. 10, the same procedure as in Example 6 was repeated except that the wet cyclone was replaced by one which is 50 mm in diameter.

EXAMPLE 8

Figure 11:
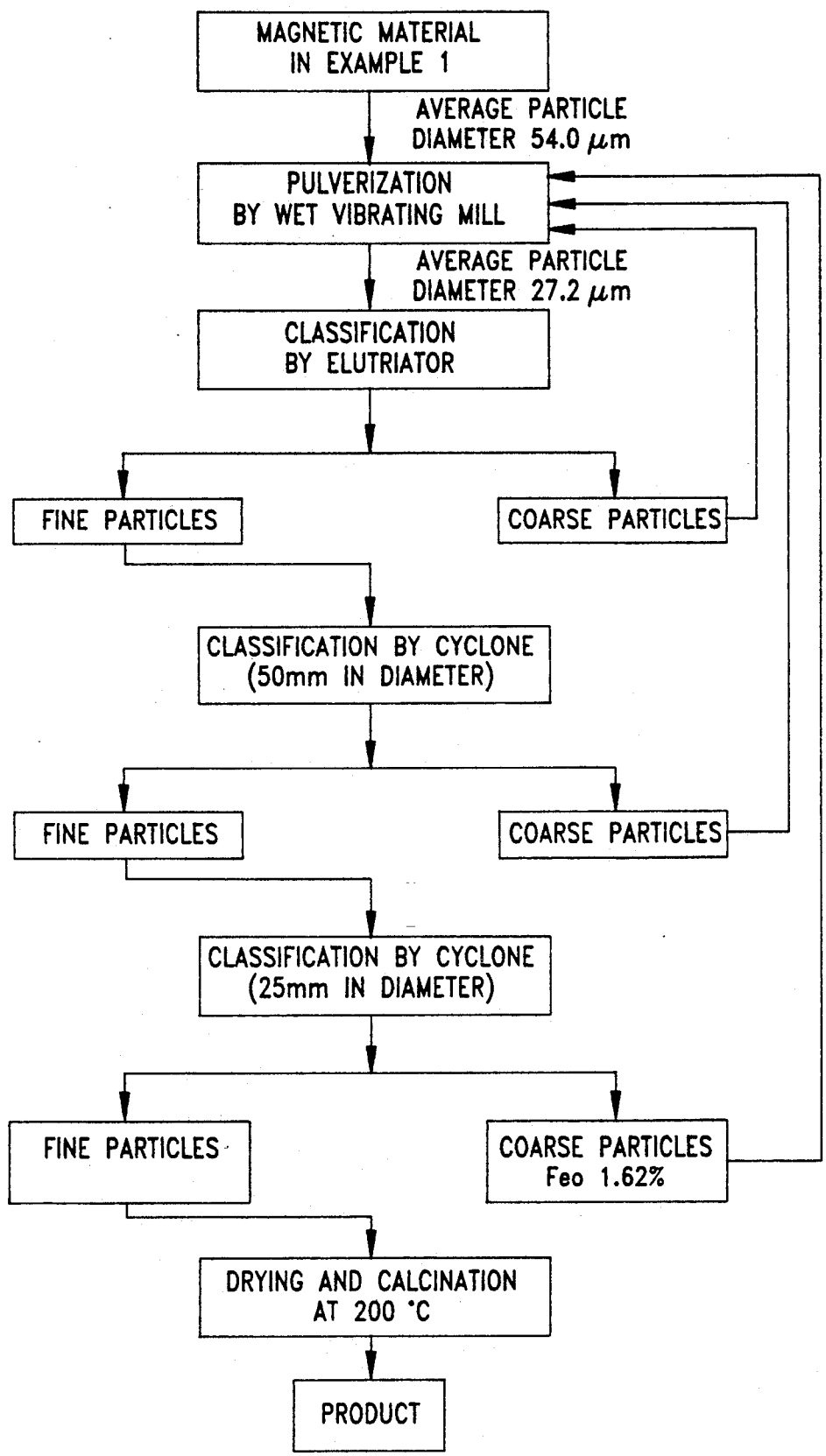
FIG. 11 is a flow diagram of the production of the product in Example 8.

According to the flow diagram shown in FIG. 11, the fine particles separated by a wet cyclone (50 mm in diameter) in Example 7 were further separated into fine particles and coarse particles using a wet cyclone (25 mm in diameter), and the fine particles were dried and calcined and the coarse particles were returned to the wet vibrating mill.

In Examples 6 to 8, the FeO content of the products before calcination was 0.27%, 0.96%, and 1.62%, respectively, and the characteristic properties of the products after calcination are as shown in Table 2. It is noted that the content of fine particles (smaller than 1.0 $\mu$m) is low and the particle size distribution is sharp.

The product in Example 8 was made into a barium ferrite, which has the following magnetic properties.
$B_r$ (G) : 4120
$bH_c$ (Oe) : 2630
$(BH)_{max}$ (MG Oe) : 4.1

COMPARATIVE EXAMPLE 4

The same procedure as in Example 6 was repeated according to the flow diagram shown in FIG. 9, except that the cyclone (75 mm in diameter) was replaced by one which is 100 mm in diameter. The resulting product was found to have a broader particle size distribution, which is indicated by the fact that the maximum particle diameter is 182.0 $\mu$m and the fraction of fine particles smaller than 1.0 $\mu$m in particle diameter accounts for 8.5 wt%, while the average particle diameter is 18.2 $\mu$m.

COMPARATIVE EXAMPLE 5

The same procedure as in Example 8 was repeated according to the flow diagram shown in FIG. 11, except that the calcination was carried out at 150° C. The product was made into a barium ferrite, which has the following magnetic properties.
$B_r$ (G) : 3950
$bH_c$ (Oe) : 2750
$(BH)_{max}$ (MG Oe) : 3.7

It is apparent that the product in Comparative Example 5 is inferior in magnetic properties to that in Example 8.

It was demonstrated by Examples 6 to 8 and Comparative Examples 4 and 5 that it is possible to produce from iron ore a high-purity powder having a uniform particle diameter by the steps of pulverization, classification, and wet magnetic separation, and the secondary pulverization and classification, followed by drying and calcination.

What is claimed is:

1. A method for producing iron oxide powder which comprises pulverizing iron ore into powder having an average particle diameter of 20-150 $\mu$m, removing particles having an average particle diameter of 5-25 $\mu$m from the powder, and subjecting the powder to wet magnetic separation in a magnetic field of 1000-5000 gauss.

2. The method defined in claim 1 wherein said iron oxide powder is high purity iron oxide powder containing less than 0.15% $SiO_2$ and less than 0.1% $Al_2O_3$.

3. The method defined in claim 1 wherein the step of wet magnetic separation removes gangue impurities.

4. A method for producing iron oxide powder having an average particle diameter in a range selected from the group of 0.8-2 $\mu$m, 2-10 $\mu$m and 10-30 $\mu$m from iron ore which comprises a first series of steps of pulverization, classification, and wet magnetic separation, and a second series of steps of pulverization and clasification which are performed by the combination of a wet grinding means and a wet cyclone, and a step of drying and calcination.

5. A method for producing iron oxide powder as defined in claim 4, wherein the first series of steps of pulverization, classification, and wet magnetic separation consist of pulverizing iron ore into powder having an average particle diameter of 20-150 $\mu$m, removing particles having an average particle diameter of 5-25 $\mu$m from the powder, and subjecting the powder to wet magnetic separation in a magnetic field of 1000-15000 gauss.

6. A method for producing iron oxide powder as defined in claim 3 or 5, wherein the second series of steps of pulverization and classification consists of the combination of a wet grinding mill and a wet cyclone 25-75 mm in diameter, and the step of drying and calcination is carried out in an oxidative atmosphere at 200° C. or above.

7. The method defined in claim 4 wherein said iron oxide powder is high purity iron oxide powder containing less than 0.15% $SiO_2$ and less than 0.1% $Al_2O_3$.

8. The method defined in claim 4 wherein the step of wet magnetic separation removes impurities.

9. A method for producing iron oxide powder comprising pulverizing iron ore into powder having an average particle diameter of 20-150 $\mu$m, separating the powder into groups having different average particle diameters and subjecting one of the separated groups having a larger average particle diameter than the other separated group to wet magnetic separation in a magnetic field of 1000-5000 gauss.

10. A method of producing iron oxide powder comprising pulverizing iron ore into powder, classifying the pulverized powder and wet magnetic separating non-magnetic particles from the classified powder.

11. The method defined in claim 10 wherein said non-magnetic particles are gangue material.

* * * * *

UNITED STATES PATENT AND TRADEMARK OFFICE
CERTIFICATE OF CORRECTION

PATENT NO. : 5,316,746
DATED : May 31, 1994
INVENTOR(S) : Yuuki Narita et al

It is certified that error appears in the above-indentified patent and that said Letters Patent is hereby corrected as shown below:

In column 4, Table 1, at Example 4, under the column "$Al_2O_3$" delete "01.0" and substitute --0.10--.

In column 8, line 36, delete "3" and substitute --4--.

On title page, item [54] and col. 1, lines 1-2, title should read as follows: --HIGH-PURITY IRON OXIDE AND METHOD FOR PRODUCTION THEREOF--.

Signed and Sealed this

Twenty-seventh Day of September, 1994

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,316,746
DATED : May 31, 1994
INVENTOR(S) : Yuuki Narita et al

It is certified that error appears in the above-indentified patent and that said Letters Patent is hereby corrected as shown below:

Column 8, line 9, please change "1000-5000" to --1000-15000--.

Column 8, line 54, please change "1000-5000" to --1000-15000--.

Signed and Sealed this

Thirteenth Day of June, 1995

*Attest:*

BRUCE LEHMAN

*Attesting Officer*     *Commissioner of Patents and Trademarks*